United States Patent [19]

Dornfeld et al.

[11] Patent Number: 5,458,343
[45] Date of Patent: Oct. 17, 1995

[54] AIRCRAFT ENGINE FIREWALL SEAL

[75] Inventors: Gerald R. Dornfeld, Peabody; Donald A. Nicklas, Danvers; Louis L. Bonhomme, Waltham, all of Mass.

[73] Assignee: General Electric Company, Cincinnati, Ohio

[21] Appl. No.: 288,856

[22] Filed: Aug. 11, 1994

[51] Int. Cl.$^6$ .............. B65D 53/00; F16J 15/32; F16K 41/00
[52] U.S. Cl. .......... 277/47; 277/233; 277/DIG. 3; 277/136; 277/216; 277/193; 277/DIG. 6; 277/227
[58] Field of Search ............. 277/47, 233, DIG. 3, 277/136, 137, 216, 193, DIG. 6, 227

[56] References Cited

U.S. PATENT DOCUMENTS

| | | | |
|---|---|---|---|
| Re. 32,395 | 4/1987 | Geffroy et al. | 277/216 |
| 334,579 | 1/1886 | Garlock | 277/216 |
| 1,292,392 | 1/1919 | Esnault-Pelterie | 277/233 |
| 3,460,842 | 8/1969 | Pointer et al. | 277/2 |
| 3,869,132 | 3/1975 | Taylor et al. | 277/26 |
| 3,934,889 | 1/1976 | Smith | 277/226 |
| 4,468,043 | 8/1984 | Brazel | 277/235 B |
| 4,714,650 | 12/1987 | Obayashi et al. | 428/265 |
| 4,758,028 | 7/1988 | Davies et al. | 285/189 |
| 4,961,588 | 10/1990 | Brienza | 277/148 |
| 5,014,917 | 5/1991 | Sirocky et al. | 239/265.11 |
| 5,091,605 | 2/1992 | Clifford | 174/65 R |
| 5,156,360 | 10/1992 | Shine | 244/129.1 |
| 5,275,530 | 1/1994 | Kujawa et al. | 277/136 |
| 5,299,811 | 4/1994 | Kershaw | 277/47 |

Primary Examiner—William A. Cuchlinski, Jr.
Assistant Examiner—Keith Hwang
Attorney, Agent, or Firm—Andrew C. Hess; Patrick R. Scanlon

[57] ABSTRACT

An aircraft engine firewall seal includes a plurality of discrete, stacked-together sealing disks each have a central hole sized for receiving a feed-through member therethrough, with the disks being larger in outer diameter than the firewall aperture through which the feed-through member extends, and with the central holes being smaller in inner diameter than the firewall aperture. The disks are retained against the firewall by a retainer which fixedly clamps together the disks around the feed-through member for sealing gas flow through the firewall aperture.

11 Claims, 3 Drawing Sheets

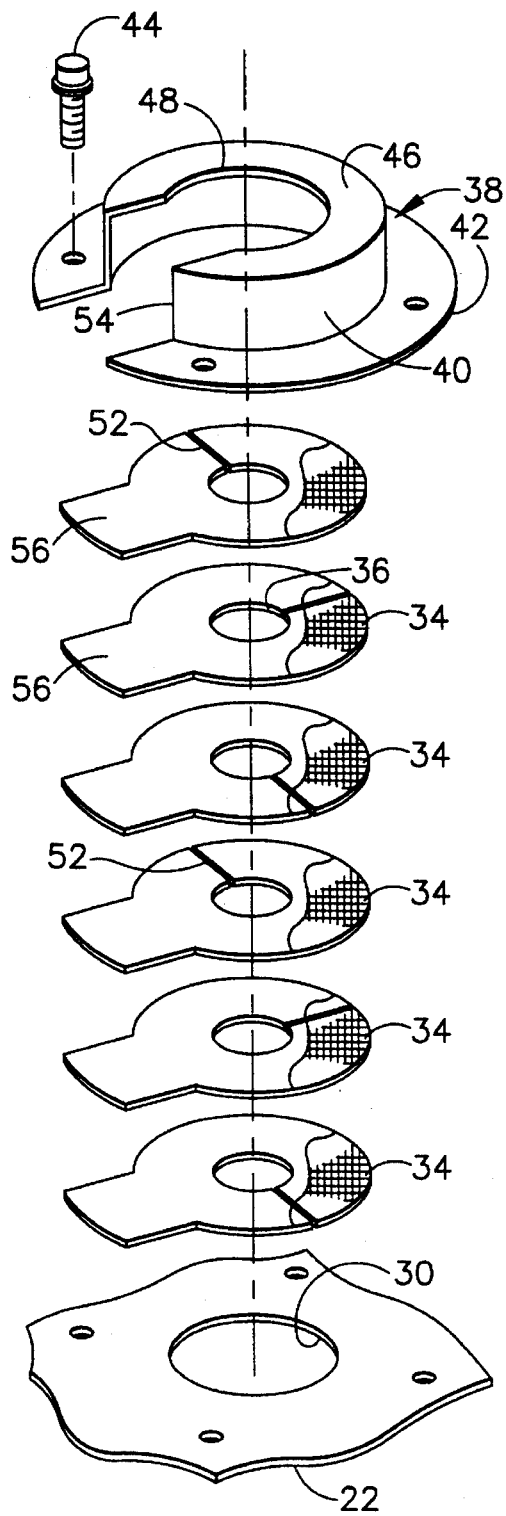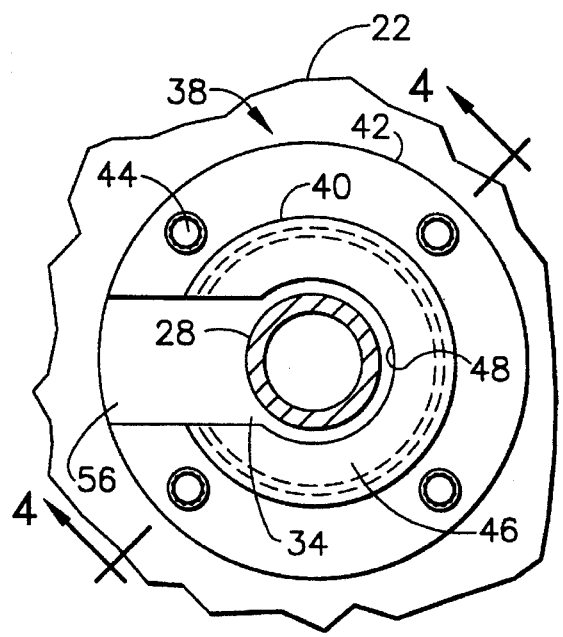
FIG. 2
FIG. 3

AIRCRAFT ENGINE FIREWALL SEAL

BACKGROUND OF THE INVENTION

The present invention relates generally to aircraft gas turbine engines, and, more specifically, to a seal for feed-through members in a firewall thereof.

An aircraft engine is mounted in an engine bay of an aircraft and includes an annular firewall surrounding the engine in the region of the combustor to separate the engine bay into a forward, relatively cool zone referred to herein as the fire zone, and a rear, relatively hot zone referred to herein as the ignition zone. Various fuel and oil lines and connections are located in the fire zone for channeling fuel into the combustor of the engine, and oil through the lubrication systems. During the useful life of the engine in the aircraft, flammable fluid such as fuel or oil may leak in the fire zone region, and the firewall is provided to reduce the possibility of the ignition thereof from the relatively hot casings contained downstream of the firewall.

The firewall typically has various feed-through members such as fluid conduits or tubes and electrical wiring harnesses which must be suitably sealed at the firewall to prevent or minimize cross fluid flow communication between the fire zone and the ignition zone during normal operation. Furthermore, the firewall must also be capable of containing any fire occurring in the fire zone for a predetermined amount of time. The typical fire test requirements as promulgated by the Federal Aviation Agency (FAA) include withstanding fire at 2,000° F. (1093° C.) for fifteen minutes. A new FAA Advisory Circular 20-135 has increased the stringency of the fire test requirements.

In one conventional type of firewall seal, an annular mushroom-shaped seal having a head attached to a tubular stem surrounds a feed-through member. The stem is positioned through an aperture in the firewall into the ignition zone, and the head abuts a side surface of the firewall in the fire zone to provide a seal. However, due to typical manufacturing tolerances, the feed-through member may be laterally offset from the centerline of the firewall hole, and may also be misaligned therethrough at a slight angle which decreases the ability of this type of firewall seal to effectively seal the aperture. Sufficient angular misalignment of the feed-through member may unseat a portion of the seal head which can allow an unacceptable amount of leakage between the fire and ignition zones. And, since the seal stem is exposed to the hot ignition zone, its useful life is limited.

SUMMARY OF THE INVENTION

An aircraft engine firewall seal includes a plurality of discrete, stacked-together sealing disks each have a central hole sized for receiving a feed-through member therethrough, with the disks being larger in outer diameter than the firewall aperture through which the feed-through member extends, and with the central holes being smaller in inner diameter than the firewall aperture. The disks are retained against the firewall by a retainer which fixedly clamps together the disks around the feed-through member for sealing gas flow through the firewall aperture.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which:

FIG. 2 is an exploded view of the seal illustrated in FIG. 1 for sealing the feed-through member at the firewall.

FIG. 3 is a partly sectional, end view of the seal installed over the feed-through member of FIG. 1 and taken generally along line 3—3.

DESCRIPTION OF THE PREFERRED EMBODIMENT(S)

Figure 1:
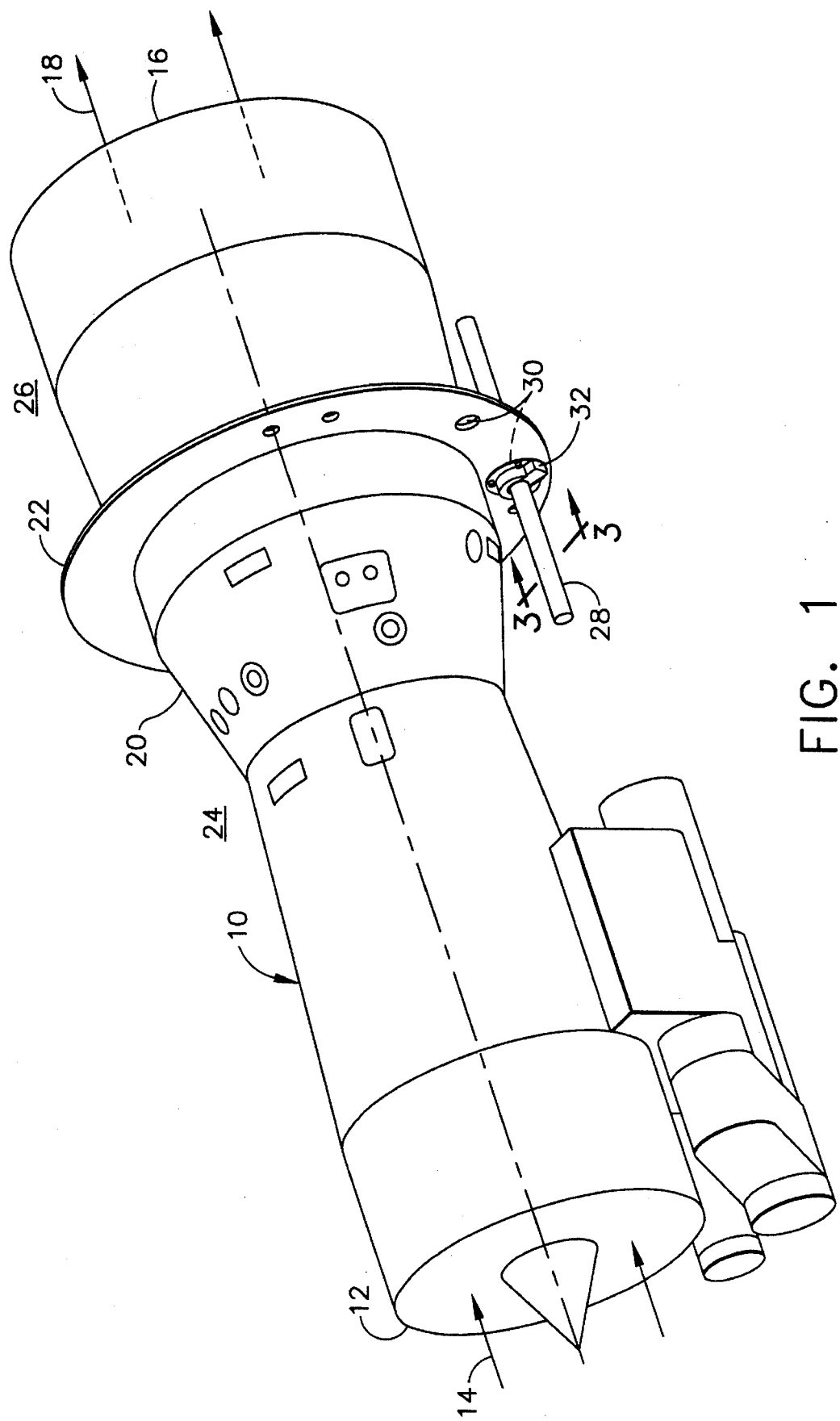
FIG. 1 is a perspective, schematic representation of an exemplary aircraft gas turbine engine including an annular firewall extending therearound at an intermediate section thereof, with the firewall including a portion of a feed-through member therethrough having a seal in accordance with the present invention.

Illustrated schematically in FIG. 1 is an exemplary aircraft gas turbine engine 10 configured for being mounted in an engine bay of an aircraft (not shown). The engine 10 includes an inlet 12 at a forward end thereof for receiving ambient air 14, and an outlet 16 at an aft end thereof for discharging relatively hot combustion or exhaust gases 18 therefrom. Disposed at an intermediate portion of the engine 10 is a conventional, thermally insulated annular combustor 20 provided with compressed air from a conventional compressor located upstream therefrom, and provided with fuel from fuel injectors (not shown) which are combined and ignited in the combustor 20 for generating the combustion gases 18 which flow downstream through conventional turbines which extract energy therefrom prior to discharging the exhaust gases 18 from the outlet 16.

Surrounding the engine 10 at an intermediate portion thereof downstream of the combustor 20 is an exemplary radially extending annular firewall 22 in the form of a flat disk with its outer perimeter being suitably joined within the engine bay (not shown) to define a forward, fire zone 24 upstream of the firewall, and a rear or aft ignition zone 26 disposed downstream of the firewall 22. The environment of the engine 10 downstream of the firewall 22 is relatively hot due to the exhaust gases 18 flowing therethrough with the air or gas surrounding the engine 10 in the ignition zone 26 being relatively hot due to conduction and radiation off hot casings and frames, whereas the air surrounding the fire zone 24 is relatively cool. However, during the useful life of the engine 10, the various fuel injectors and lubricating oil conduits, or the various fittings thereof, may develop leaks of flammable fluid into the fire zone 24, with the firewall 22 being provided to ensure that any leaking flammable fluid is not ignited by the hot casings or frames in the ignition zone 26.

The firewall 22 typically includes various feed-through members 28 which are represented schematically by the elongate tubular member illustrated in FIG. 1 which represents either a fluid carrying tube or conduit, or a typical wiring harness containing a grouping of electrical wires therein. The firewall 22 therefore includes a suitable aperture 30 through which the feed-through member, or simply feed-through, 28 extends from the fire zone 24 to the ignition zone 26, and which is suitably connected as conventionally known.

Federal Aviation Agency (FAA) requirements include maintaining an effective seal of the feed-through 28 through the firewall 22 for fifteen minutes under a 2,000° F. (1093° C.) fire. The fire test requirements have been made more stringent in an FAA Advisory Circular 20-135 for ensuring containment of a fire in the fire zone 24 without breaching the firewall 22 through the apertures 30 therein within the fifteen minute requirement.

In accordance with one embodiment of the present invention, a firewall seal 32 surrounds the feed-through 28 on the fire zone 24 side of the firewall aperture 30 for providing an effective seal thereat. The seal 32 is illustrated in more particularity in FIG. 2 and includes a plurality of discrete, stacked-together sealing disks 34 each having a central hole 36 sized for receiving the feed-through 28. For example, the diameter of the hole 36 may be nominally equal to the outer diameter of the feed-through 28 for providing a relatively tight seal thereat. And, the disks 34 are suitably larger in outer diameter than the diameter of the firewall aperture 30 so that they overlap the firewall 22 around the aperture 30. The disk holes 36 are also smaller in inner diameter than the diameter of the aperture 30 for receiving the feed-through 28 and allowing a suitable amount of assembly tolerance within the aperture 30 without allowing the feed-through 28 to chafe against the firewall 22.

A retainer 38 surrounds and clamps together the several disks 34 against the firewall 22 around the feed-through 28 passing through the aperture 30 for sealing gas flow therethrough as shown in FIG. 3 for example. As shown in FIG. 2, each of the disks 34 is a flat laminate independent from the other disks 34 and is imperforate except for the central hole 36 therein. The several disks 34 are therefore exclusively retained in position by solely the retainer 38. Each of the disks 34 is formed of a fire-resistant fabric or cloth weave in a fire-resistant matrix of conventional composition.

As shown in FIG. 2, the retainer 38 includes a tubular housing 40 having an integral arcuate or annular mounting flange 42 at a proximate end thereof which extends radially outwardly from its centerline for being fixedly mounted by suitable bolts 44 and complementary nuts to the firewall 22 around the aperture 30 therein. At an opposite, distal end of the housing 40 is an integral arcuate or annular endplate 46 which extends radially inwardly and includes a central access hole 48 therein.

Figure 4:
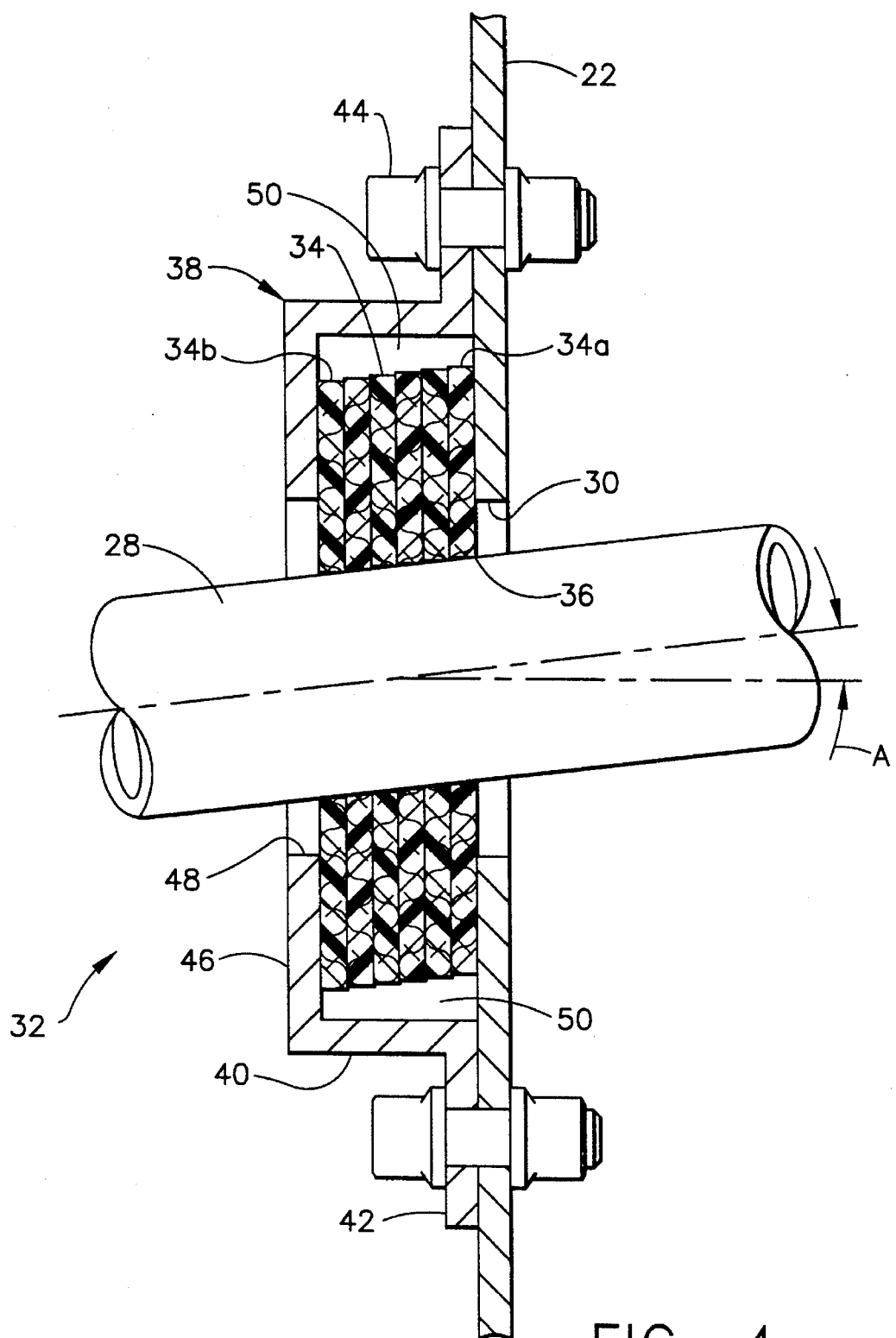
FIG. 4 is an elevational, partly sectional view of the seal illustrated in FIG. 3 and taken along line 4—4.

As shown in FIG. 4, the housing 40 is sized in depth for receiving all the disks 34 therein when mounted to the firewall 22, and the housing 40 has an inner diameter predeterminedly larger than the outer diameter of the disks 34 to define an annular gap 50 between the perimeter of the disks 34 and the inner circumference of the housing 40 for accommodating misalignment of the feed-through 28 through the firewall aperture 30 during assembly of the seal 32. When the retainer mounting flange 42 is bolted to firewall 22, the endplate 46 is positioned against the outermost or top one of the disks 34b which clamps together the several disks 34 against the firewall 22.

FIG. 4 illustrates the ability of the independent and discrete disks 34 to accommodate misalignment of the feed-through 28 through the firewall aperture 30. The feed-through 28 is illustrated with a slight angular misalignment A through the aperture 30 which causes adjacent ones of the disks 34 to slide relative to each other prior to being clamped together by the retainer 38. As shown in FIG. 4, each of the disks 34 is slightly offset relative to an adjacent disk (with the offset being exaggerated in the figure) but with the disks 34 remaining flat against each other with the innermost or base disk 34a remaining flat against the firewall 22. In this way, the slight misalignment of the feed-through 28 is effectively accommodated by the misalignment of the several disks 34 which may then be clamped together by the retainer 38 into their final position illustrated in FIG. 4. The disks 34 also accommodate offset misalignment through the aperture 30 by translating with the feed-through 28 while their perimeters maintain sealing.

The inner holes 36 of the several disks 34 provide a labyrinth-type close seal with the outer circumference of the feed-through 28, with the radially outer portions of the disks 34 being clamped together and between the endplate 46 and the firewall 22 to provide an effective seal thereat. The stacked disks 34 illustrated in FIG. 4 include a one end thereof the base disk 34a which is positioned flat against the firewall 22, and at an opposite end thereof the top disk 34b is positioned flat against the inner surface of the retainer endplate 46. Although at least two disks 34 may be used, in the preferred embodiment of the invention, a plurality of additional ones of the sealing disks 34 are disposed between or intermediate the base and top disks 34a, 34b for increasing the ability to accommodate misalignment of the feed-through 28 and the ability to withstand the required FAA fire testing.

More specifically, in the required fire testing, a 2,000° F. (1093° C.) flame is maintained on the fire zone side of the seal 32, which is the retainer 38 side of the seal illustrated in FIG. 4, which flame must be maintained for fifteen minutes without breaching the seal 32 into the ignition zone 26 side of the seal 32, which is to the right of the firewall 22 illustrated in FIG. 4. The fire-resistant fabric forming the disks 34 includes any conventional material such as fiberglass or ceramic, suitable materials being known under the trademarks Nomex and Nextel. The fabrics are impregnated or contained in a matrix of a suitable fire-resistant material including for example room temperature vulcanizing (RTV) elastomer such as silicone, high temperature vulcanizing (HTV) elastomer which can also be a silicone, and polytetrafluoroethylene (PTFE).

The use of several discrete disks 34 within the seal 32 allows for one or more of the disks 34 adjacent the endplate 46 to be consumed or ablated during a fire, with the remainder of the disk 34 maintaining an effective seal against propagation of the flame through the aperture 30 into the ignition zone side of the firewall 22. Furthermore, the multiple disks 34 provide multiple layers of heat insulators to reduce heat transmission from the flame during the test to the disks adjacent to the firewall 22 to reduce or prevent the possibility of ignition of those disks due to outgassing of the elastomer materials forming those disks. Preventing ignition of the elastomer outgassing materials on the back or ignition side of the firewall 22 is also an FAA requirement.

In the exemplary embodiment illustrated in FIGS. 2 and 4, six disks 34 are provided for meeting the FAA fire test requirements with the first four disks 34 adjacent to the endplate 46 being identical in composition including silicone impregnated Nextel or fiberglass. The bottom two disks 34 adjacent to the firewall 22 are preferably PTFE coated or impregnated fiberglass. Since the firewall 22 becomes quite hot during the component fire test, the PTFE impregnated disks 34, including the base disk 34a, are preferred adjacent to the firewall 22 since the outgasses they produce are not combustible, whereas the outgasses produced from the outer silicone impregnated disks 34, including the top disk 34b, are combustible. Accordingly, ignition of outgassing materials on the ignition zone side of the firewall 22 may be prevented by selectively providing different material compositions between the base and top disks 34a,b so that the base disk 34a does not emit combustible outgasses upon heating thereof from the firewall 22.

Since the feed-through 28 is typically preinstalled through the firewall 22 during the assembly process, the several disks 34 and the retainer 38 are preferably not fully annular in the preferred embodiment but are configured for assembly thereto after the feed-through 28 is firstly installed. As shown in FIG. 2, each of the disks 34 preferably includes a radial through slit 52 from the central hole 36 to the perimeter of the disk 34 at one circumferential location of the disk 34 for allowing each of the disks 34 be installed over the feed-through 28 upon elastic opening of the disk 34 at the slit 52. Once the disks 34 are installed over the feed-through 28, they are returned to their flat shape, with the opposing ends of the disks 34 defining the slit 52 abutting each other for providing an interference seal thereat. The disk slits 52 are preferably circumferentially spaced apart from each other, also referred to as clocking, so that adjacent slits 52 are not aligned with each other. As illustrated in FIG. 2, each succeeding slit 52 is about 90° apart for providing a more effective seal from disk-to-disk upon final assembly.

The retainer 38 illustrated in FIG. 2 correspondingly preferably includes a radial cutout or slot 54 at one circumferential location through the mounting flange 42, the housing 40, and the endplate 46 sized for assembly over the feed-through member 28. The width of the slot 54 is slightly larger than the outer diameter of the feed-through 28 so that the retainer 38 may be assembled over the feed-through 28 and bolted to the firewall 22 for clamping the disks 34 within the housing 40. In order to fill the slot 54 for reducing the possibility of leakage therethrough, each of the disks 34 preferably further includes a generally rectangular tab 56 as shown in FIG. 2 which extends radially outwardly from one circumferential location thereof with all of the tabs 56 being aligned and stacked together within the retainer slot 54 as illustrated in more particularity in FIG. 3. As shown in FIG. 2, each of the successive tabs 56 is preferably differently angularly spaced from its respective disk slit 52 to provide a convenient manner of clocking the several slits 52 when the tabs 56 are aligned together and positioned within the retainer slot 54, which is therefore effective for maintaining the differential positioning of the respective slits 52.

Accordingly, the improved seal 32 having the several stacked together disks 34 provides an effective seal during aircraft engine operation which prevents or reduces the leaking of flammable vapors from the fire zone 24 through the firewall apertures 30 and into the ignition zone 26 which could lead to ignition thereof and a resulting fire. And, in the event of a fire in the fire zone 24, the multiple fire-resistant disks 34 provide an effective seal for preventing penetration of the flame through the firewall aperture 30 for meeting the required FAA fire tests requirements. The different composition base disk 34a is effectively insulated from the fire by the remaining disks 34, and since the outgassing materials from the base disk 34a are preferably not flammable, the ignition thereof is prevented.

We claim:

1. An aircraft engine firewall seal for an elongate feed-through member extending through an aperture in a firewall of an aircraft gas turbine engine comprising:

a plurality of discrete, stacked-together sealing disks each having a central hole sized for receiving said feed-through member, said disks being larger in outer diameter than said firewall aperture, with said central holes being smaller in inner diameter than said firewall aperture; and a retainer for fixedly clamping together said disks against said firewall around said feed-through member passing through said firewall aperture for sealing gas flow therethrough.

2. An aircraft engine firewall seal according to claim 1 wherein said retainer comprises:

a tubular housing having an annular mounting flange at a proximate end thereof for being fixedly mounted to said firewall around said aperture therein, and having at an opposite, distal end thereof an annular endplate having an access hole therein; and said housing is sized for receiving all said disks when mounted to said firewall, with said housing having an inner diameter predeterminedly larger than said outer diameter of said disks for accommodating misalignment of said feed-through member through said firewall aperture, and said endplate being positionable to clamp together said disks against said firewall.

3. An aircraft engine firewall seal according to claim 2 wherein each of said disks is a fire-resistant fabric in a fire-resistant matrix.

4. An aircraft engine firewall seal according to claim 3 wherein each of said disks includes a radial slit from said central hole to said perimeter at one circumferential location thereof for allowing each of said disks to be installed over said feed-through member upon opening said disks at said slit; and said disk slits are circumferentially spaced apart from each other.

5. An aircraft engine firewall seal according to claim 4 wherein said stacked disks include:

at one end thereof a base disk for being positioned flat against said firewall, and at an opposite end thereof a top disk for being positioned flat against said retainer endplate; and a plurality of additional ones of said sealing disks disposed intermediate said base and top disks.

6. An aircraft engine firewall seal according to claim 5 wherein said fabric forming said disks is selected from the group including fiberglass and ceramic, and said matrix is selected from the group including room temperature vulcanizing (RTV) elastomer, high temperature vulcanizing (HTV) elastomer, and polytetrafluoroethylene (PTFE).

7. An aircraft engine firewall seal according to claim 6 wherein said base and top disks are different in material composition from each other so that said base disk does not emit combustible out-gasses upon heating thereof from said firewall.

8. An aircraft engine firewall seal according to claim 7 wherein:

said retainer further includes a slot at one circumferential location thereof through said mounting flange, said housing, and said endplate, said slot being sized for assembly over said feed-through member;

each of said disks further includes a tab extending radially outwardly from one circumferential location thereof, with each successive tab being differently angularly spaced from respective disk slits; and said tabs are aligned with each other in said retainer slot to fill said slot and for maintaining differential positioning of said disk slits.

9. An aircraft engine firewall seal according to claim 4 wherein:

said retainer further includes a slot at one circumferential location thereof through said mounting flange, said housing, and said endplate sized for assembly over said feed-through member;

each of said disks further includes a tab extending radially outwardly from one circumferential location thereof, with each successive tab being differently angularly spaced from respective disk slits; and said tabs are aligned with each other in said retainer slot to fill said slot and for maintaining differential positioning of said disk slits.

10. An aircraft engine firewall seal according to claim 4 wherein said feed-through member is a tube for carrying fluid.

11. An aircraft engine firewall seal according to claim 4 wherein said feed-through member is a tube for carrying an electrical wiring harness.

* * * * *